United States Patent

[11] 3,550,866

| [72] | Inventor | Eskil W. Swenson |
| | | Rockford, Ill. |
| [21] | Appl. No. | 797,921 |
| [22] | Filed | Feb. 10, 1969 |
| [45] | Patented | Dec. 29, 1970 |
| [73] | Assignee | Swenson Spreader & Mfg. Co. |
| | | Lindenwood, Ill. |
| | | a corporation of Illinois |

[54] MATERIAL SPREADING APPARATUS
4 Claims, 4 Drawing Figs.
[52] U.S. Cl. ................................................. 239/677,
214/83.36, 239/146
[51] Int. Cl. ........................................A01c 19/00,
E01c 19/20
[50] Field of Search.......................................... 214/83.36;
239/677, 146

[56] References Cited
UNITED STATES PATENTS

| 2,381,505 | 8/1945 | Lindholm..................... | 214/17.62X |
| 3,344,993 | 10/1967 | Wilder et al. ................ | 239/677X |

*Primary Examiner*—Lloyd L. King
*Attorney*—McCanna, Morsbach, Pillote & Muir

ABSTRACT: A wheeled vehicle-type material spreading apparatus for spreading material at a rate correlative with the speed of the vehicle and which has photoelectric sensing means for sensing the speed of the vehicle and operative to produce a pulse signal having a pulse repetition rate proportional to the speed of the vehicle and apparatus responsive to the pulse repetition rate for controlling the rate of discharge of material.

PATENTED DEC 29 1970

Inventor
Eskil W. Swanson
By
McCanna, Morsbach, Pillote + Muir
Attorneys

3,550,866

MATERIAL SPREADING APPARATUS

BACKGROUND OF THE INVENTION

This invention relates to spreader apparatus of the type disclosed in the U.S. Pat. Wilder et al. No. 3,344,993 for spreading material at a rate correlative with the speed of the vehicle. In one embodiment of the spreader apparatus disclosed in the aforementioned patent, two electromagnetic sensing means, each including a serrated disc of ferromagnetic material and a magnetic pickup, are provided for sensing the speed of the vehicle and the speed of the discharge means. Such electromagnetic sensing means produce an output voltage which is correlative in amplitude with the speed at which the ferromagnetic disc is rotated. Thus, one of the sensing means produces an output voltage correlative in amplitude with the speed of the vehicle and the other electromagnetic sensing means produces an output voltage correlative in amplitude with the speed of the discharge means. These two output voltages are applied to a differential relay which compares the amplitude of the output voltages and operates to control the speed of discharge means to maintain a preselected ratio between the speed of the vehicle and the speed of the discharge means.

When spreading materials from a wheeled vehicle-type material spreading apparatus, it is frequently desirable to effect spreading over a wide range of vehicles speeds from zero or substantially zero speed on up to highway speeds. Moreover, it is desirable to at least substantially shutoff discharge of material when the vehicle is stopped and to commence spreading as soon as the vehicle starts to move. Difficulties have been encountered using electromagnetic sensing means which produce an output voltage correlative in amplitude with the speed of the vehicle, particularly at low vehicle speeds. The output voltage from such electromagnetic sensing means is so low at low vehicle speeds, for example of the order of five miles per hour and less, that it is difficult to utilize the same to reliably control the discharge means to maintain the rate of spread correlative with the speed of the vehicle at the low vehicle speeds. On the other hand, at relatively high vehicle speeds such as are encountered on the highway, the output voltage becomes quite high and difficulties are sometimes encountered in maintaining linearity in the speed-voltage response curve of the electromagnetic generators. Further, the torque resistance on the armature of the electromagnetic type sensors is not uniform but instead fluctuates as the teeth on the armature moves past the pole piece of the electromagnetic pickup. When driving such electromagnetic generators from a speedometer cable, this pulsating torque load on the speedometer cable not only tends to produce premature failure of the speedometer cable, but also sometimes causes the voltage output to become erratic at some speeds.

SUMMARY OF THE INVENTION

The present invention relates to a vehicle-type material spreading apparatus for spreading material at a rate correlative with the speed of the vehicle and which has photoelectric sensing means for sensing the speed of the vehicle and operative to produce a pulse signal having a pulse repetition rate proportional to the speed of the vehicle, together with apparatus responsive to the pulse repetition rate for controlling the rate of discharge of material. The photoelectric sensing means produces an output signal having a relatively high amplitude even at very low speeds, but the frequency or pulse repetition rate of the signal varies proportional to the speed of the vehicle. This provides a pulse from the photoelectric sensing means which is generally uniform in amplitude throughout the full range of vehicle speeds and which is sufficiently high in amplitude to enable accurate control of the speed of the discharge means, even at very low vehicle speeds, for example as low as a few tenths of a mile per hour. Moreover, the photoelectric sensing means employs a rotating element for interrupting transmission of light from the light transmitting source to the photosensitive unit, and which rotary element does not impose a pulsating load on the speedometer drive cable. The pulse repetition rate from the photoelectric pickup varies linearly with the speed of the rotary element, and hence with the speed of the vehicle or discharge means which is sensed thereby.

An important object of the present invention is to provide a vehicle-type material spreading apparatus which is adapted to spread material at a rate correlative with the vehicle speed from substantially zero vehicle speed on up to a relatively high vehicle speed.

A more particular object of this invention is to provide a vehicle-type material spreading apparatus having photoelectric sensing means for sensing the speed of the vehicle and operable to produce a pulse signal having a pulse repetition rate proportional to the speed of the vehicle, and apparatus responsive to the pulse repetition rate for controlling the rate of discharge of material.

Another object of this invention is to provide a vehicle-type material spreading apparatus for spreading material at a rate correlative with the speed of the vehicle and which has photoelectric sensing means for sensing the speed of the vehicle and for sensing the speed of the discharge means, and apparatus responsive to the pulse repetition rates of the photoelectric vehicle speed sensor and the photoelectric discharge speed sensor for controlling the speed of the discharge means to maintain the rate of discharge correlative with the speed of the vehicle.

These, together with other objects and advantages of this invention will be better understood by reference to the following detailed description when taken in connection with the accompanying drawings therein:

Figure 1:
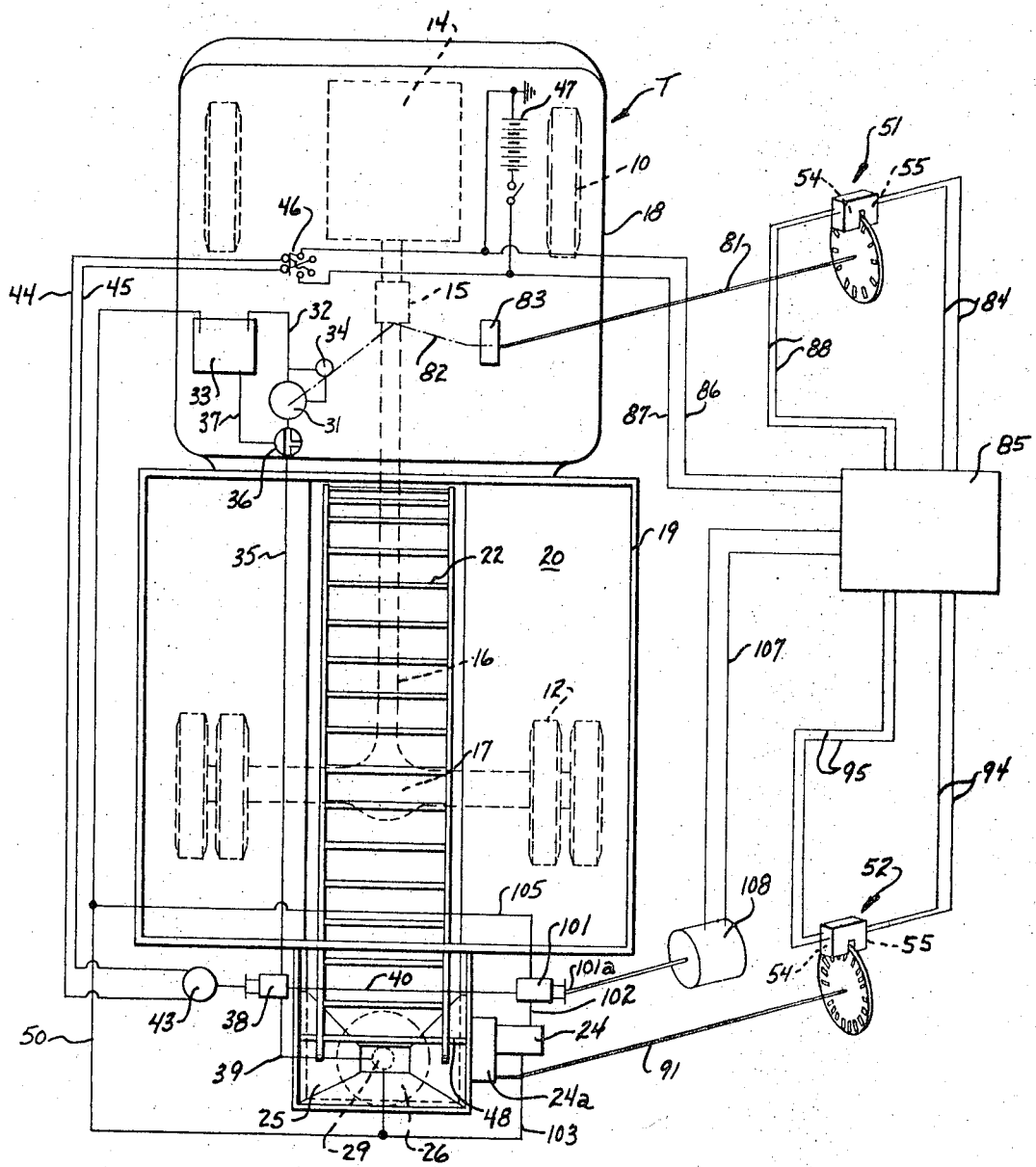
FIG. 1 is a diagrammatic plan view of a truck having spreader apparatus and embodying the improved photoelectric speed sensing means and controls of the present invention.

The invention generally relates to a vehicle-type spreader apparatus for spreading material at a rate correlative with the speed of the vehicle, and the spreader apparatus may not only be used with widely different types of vehicles such as trucks, trailers, farm wagons and the like, but also may be used to spread different types of material including granular material such as salt, sand, granular fertilizer, and the like as well as liquid materials, as disclosed in the aforementioned U.S. Pat. No. 3,344,993. In the embodiment illustrated, the invention is shown applied to a truck-type vehicle designated generally by the letter T, of any suitable construction, and which includes front steering wheels 10 and rear drive wheels 12. The truck motor 14 is connected through a transmission 15, drive shaft 16, and differential 17 to the rear wheels 12 to propel the vehicle. A cab or operator's compartment 18 is provided adjacent to the front end of the truck and a material storage means such as a box or hopper 19 is mounted at the rear end of the truck. The box or hopper 19 may be of any suitable type and, as illustrated, is of the V-box type which includes sides 20 sloping toward a centrally located discharge means conveniently in the form of a conveyor 22 located within the box at the base of the V-shaped sides thereof. The conveyor 22 may be of any construction which will feed material at a rate correlative with the speed at which the conveyor is driven and in the embodiment illustrated, the conveyor is of the endless type, it being understood that other types of conveyors could be used for delivering material from the box. In the preferred embodiment, the conveyor has a rotary drive shaft 48 driven by a hydraulic motor 24 of the positive displacement type such as a gear, vane, internal gear or piston motor.

In the embodiment illustrated, the conveyor 22 feeds the material to a broadcast-type spreader including a chute 25 and broadcast disc 26. As is conventional in broadcast spreaders, the broadcast disc is operative to throw material outwardly over an area and the width of spread of material can be varied by varying the speed of the broadcast disc.

The broadcast spreader and the discharge means are preferably hydraulically driven and an hydraulic fluid pressure supply system is provided on the vehicle. The hydraulic fluid pressure supply system includes a pump 31 having an inlet 32 connected to a reservoir 33. A relief valve 34 may be provided for limiting the pressure delivered by the pump to the delivery line 35. Provision is advantageously made for bypassing fluid from the delivery line back to the reservoir, when the hydraulic system is not in use and as diagrammatically shown this is achieved by a bypass valve 36 diagrammatically shown as a three-way valve movable from the delivery position shown to a position communicating the pump outlet with a bypass line 37 leading to the reservoir.

A valve is preferably provided in the delivery line 35 to control the rate of flow of fluid to an hydraulic drive motor 29 for the broadcast spreader, to thereby control the width of the spread. In the hydraulic control system shown, this is advantageously achieved through the use of an adjustable pressure-compensated flow control valve 38 in a manner more fully disclosed in the U.S. Pat. to Swenson et al. No. 3,113,784, to which reference is hereby made for a more complete description. The pressure-compensated valve 38 in general includes a supply unit connected to the pump delivery line 35, a controlled outlet connected to a line 39 leading to the hydraulic motor 29, and a bypass outlet connected to a bypass line 40. Such pressure-compensated flow control valves operate to sense the pressure drop across a selectively adjustable orifice between the pressure inlet and the controlled outlet line 39, and includes a pressure-operated valve means responsive to the pressure differential produced across the orifice from maintaining a substantially constant pressure drop across the orifice to thereby maintain a preselected rate of flow through the orifice determined by the adjustment thereof and substantially independent of the speed of the pump or the load on the hydraulic motor. Fluid not delivered to the controlled outlet 39 is bypassed to the bypass conduit 40. The adjustable flow control valve 38 can be located in the cab for adjustment by the operator or, in the preferred form shown, is located adjacent the rear of the truck and operated under a reversible electric motor 43 connected through lines 44 and 45 and reversing switch 46 to the vehicle electrical power supply including battery 47. With this arrangement, the pressure-compensated flow control valve can be opened or closed from the cab by manipulating the switch 46. Fluid from the broadcast spreader drive motor 29 is returned to the reservoir 33 through a return line 50.

Figure 2:
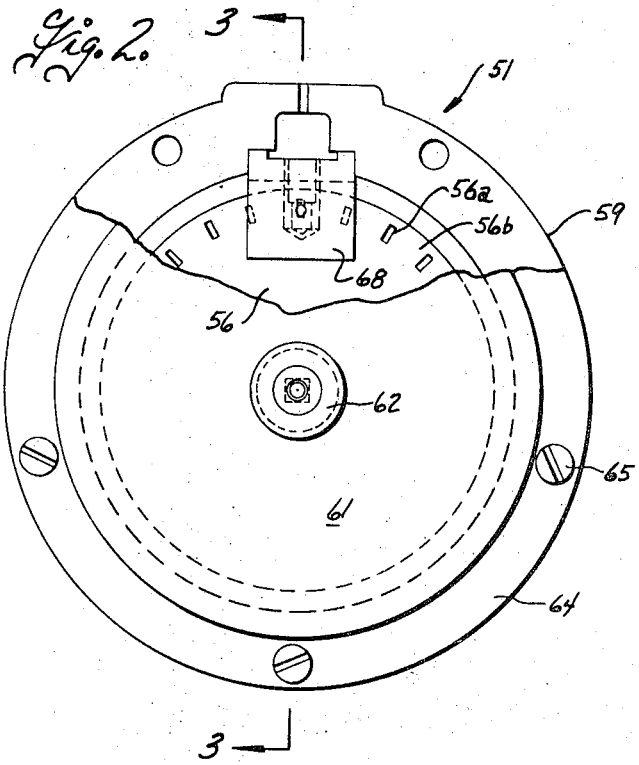
FIG. 2 is a side view of a photoelectric sensing apparatus, with parts broken away to illustrate details of construction.
Figure 3:
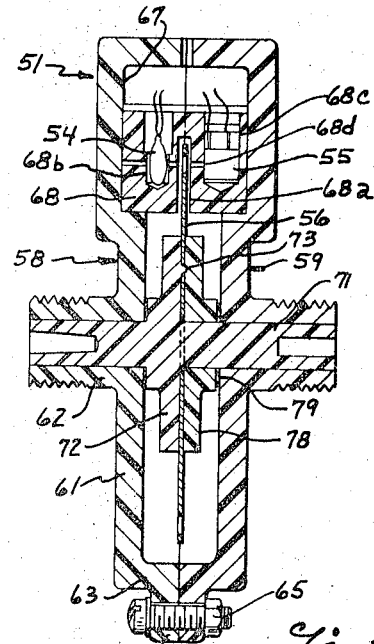
FIG. 3 is a sectional view taken on the plane 3—3 of FIG. 2.
Figure 4:
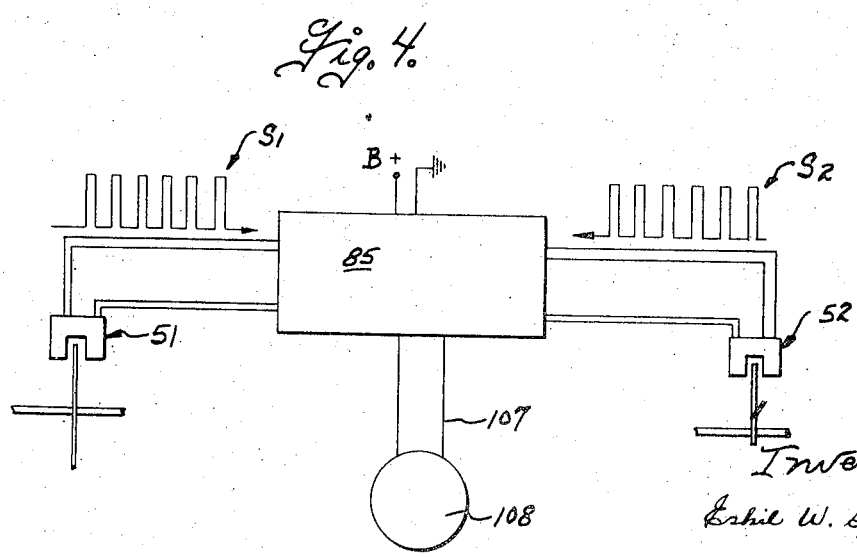
FIG. 4 is a schematic view of the speed sensing and control apparatus and graphically illustrating the signal outputs from the photoelectric sensing means.

The vehicle-type material spreading apparatus has means for automatically varying the speed of the discharge means to vary the rate of discharge of material in accordance with the speed of the vehicle. In spreading material from a vehicle-type spreading apparatus, it is necessary to effect spreading over a wide range of vehicle speeds from substantially zero speed up through relatively high highway speeds. For example, when a truck-type spreader apparatus stops, as may occur at an intersection, it is desirable to continue discharging material at a rate proportional to the vehicle speed until the truck has stopped, and then interrupt discharge of material while the truck is stopped to prevent discharge of excess material at that location, and to thereafter begin discharging material again as soon as the truck begins to move to avoid any blank areas which would not be covered by the material. In order to adapt the spreader to discharge materials over the wide range of vehicle speeds from substantially zero up to full highway speeds, an improved speed sensing and control system has been provided. In general, the improved sensing means includes a photoelectric sensing unit for sensing the speed of the vehicle and which is operative to produce an output signal of sufficiently high amplitude to be usable for accurate control, the order of a few tenths of a mile per hour. The photoelectric sensing unit is arranged to produce an output signal having a frequency or pulse repetition rate which is correlative with speed, but which does not vary substantially in amplitude with speed. In the preferred embodiment shown, a first photoelectric sensing means 51 is provided for sensing the speed of the vehicle and a second photoelectric sensing means 52 is provided for sensing the speed of the discharge means. The photoelectric sensing means each produce a pulse output signal S, (FIG. 4), having a pulse repetition rate or frequency proportional to the speed of the item being sensed. One of the photoelectric units 51 is shown approximately full-size in FIGS. 2 and 3, to illustrate details of construction, it being understood that the other photoelectric sensing means 52 is similarly constructed. The photoelectric sensing means includes a light source 54 herein shown in the form of a bulb, a photosensitive unit 55, and a rotary element 56 for interrupting light transmission from the light source to the photosensitive unit at a frequency proportional to the speed of the rotary element to produce a pulse signal having a pulse repetition rate proportional to the speed of the rotary element. As best shown in FIG. 3, the photoelectric unit is enclosed in a housing conveniently formed in two opposed halves 58 and 59 of like form. The housing half-sections are preferably similarly formed and each includes a sidewall 61 having a central boss 62 extending therefrom to form a bearing support. The housings have a marginal wall 63 which extends around the major periphery of the sidewall 61 and an outwardly extending flange on the marginal wall 63. The flange on opposing housing half-sections are disposed in abutting relation and are held in assembled relation by fasteners 65. The housing half-sections also include a laterally enlarged pocket 67 for nonrotatably receiving and supporting a mounting block 68.

The rotary light interrupter element 56 is advantageously in the form of a thin disc supported for rotation in the housing on a shaft 71. A disc mounting flange 72 is conveniently formed integrally with the shaft 71 and, as shown, has one or more drive lugs 73 formed thereon adapted to extend into a corresponding opening in the disc to nonrotatably connect the disc to the flange 72. A second flange 78 is provided at the opposite side of the disc and may be either attached to the shaft or held in assembled relation with the shaft and disc by engagement of the hub portions on the flanges 72 and 78 with the inner sides of the walls 61 of the housing. The housing half-sections 58 and 59 can conveniently be formed of plastic and the shaft 71 and flanges 72 and 78 can also be formed of plastic. In order to reduce friction between the plastic surface, washers 79 may be interposed between the hub portions on the flanges and the adjacent side walls of the housing.

The mounting block 68 is formed with a slot 68a for receiving the peripheral portion of the disc 56 and the light source 54 and photosensitive unit 55 are conveniently mounted in sockets 68b and 68c formed in the mounting block 68 at opposite sides of the slot 68 a. A light-transmitting passage 68d is also formed in the mounting block to extend between the sockets 68b and 68c to transmit light from the source 54 to the photosensitive unit 55. The light-interrupting disc 56 has apertures 56a at uniformly spaced locations around the periphery thereof, which apertures are separated by opaque disc sections 56b. The apertures or openings 56a are spaced uniformly around the periphery of the disc and are separated by equal-width segments 56b so that light transmission occurs from the source 54 to the photosensitive unit 55 in pulses when the openings 56a register with the passage 68d, and the light transmission is interrupted when the intervening segments 56b extend across the passage 68d. In this manner, the light transmitted to the photosensitive unit 55 occurs in pulses having a frequency or repetition rate proportional to the speed of the rotary element 56. The rotary element 56 of the photoelectric means 51 is driven at a speed proportional to the speed of the vehicle as by a shaft 81 diagrammatically shown in FIG. 1. It is frequently convenient to take the drive for the sensing unit shown in FIG. 1, the shaft 81 is connected by a suitable fitting to the speedometer cable 82 which normally drives the vehicle speedometer 83.

The photosensitive unit 55 can be of various different types and may for example, comprise a photoemissive cell or a photoconductive cell of a type having a sufficiently rapid speed of response to produce a pulse signal in response to the momentary light pulses transmitted to the photosensitive cell. Photodiodes or phototransitors are a presently preferred form of photosensitive unit.

The photosensitive unit 55 is connected through lines 84 to a frequency responsive circuit 85 which is responsive to the repetition rate of the pulse signal from the photosensitive unit 55. The control circuit 85 is connected to lines 86 and 87 to the vehicle power supply, as shown in FIG. 1, to be energized thereby and conveniently the power for the illuminating source 54 can be supplied from circuit 85 as through lines 88.

In the servocontrol system illustrated, the second photoelectric sensing unit 52 is connected as through a shaft 91 to the discharge means 22 to sense the speed of the discharge means and produce a second signal 52 having a pulse repetition rate proportional to the speed of the discharge means 22. As diagrammatically shown, the shaft 91 is connected to a gear box 24a associated with the discharge means 22 and the hydraulic drive motor 24, so that the rotary element of the sensing means 52 is driven at a speed proportional to the speed of the discharge means. The photosensitive unit 55 of the sensing means 52 is connected as through lines 94 to the frequency responsive circuit 85 and the source of illumination 54 for the sensing unit 52 is also conveniently energized from the circuit 85 as through lines 95.

A control means is provided for varying the speed of the discharge means. In the embodiment shown having an hydraulic motor 24 for driving the discharge means, the control means is arranged to control the rate of flow of fluid to the hydraulic motor to vary the speed thereof. In the particular embodiment illustrated, the means for controlling the rate of flow of fluid to the motor 24 includes a valve means 101 having a controlled outlet connected through a line 102 to the hydraulic motor 24, the return line 103 from the motor being connected to the reservoir return line 50. Fluid under pressure for the hydraulic drive motor 24 may conveniently be provided by the previously described hydraulic control system used for driving the hydraulic spreader motor 29. As shown, the bypass outlet 40 from the pressure-compensated flow control valve 38 is connected to the supply inlet of the valve 101, a bypass line 105 being provided to bypass excess fluid back to the return line 50. The valve 101 is also preferably of the pressure-compensated flow control type as more fully described in the aforementioned U.S. Pat. to Swenson et al. No. 3,113,784 and which includes an adjustable orifice between the pressure inlet line 40 and the controlled outlet 102 and a pressure-responsive valve means responsive to the pressure differential across the orifice for maintaining a substantially constant rate of flow to the controlled outlet as determined by the setting of the adjustable orifice. The orifice of the valve 101 is adjustable as by an operator 101a and an electroresponsive means, herein shown in the form of a motor 108, is connected to the valve operator 101a to variably open and close the valve. While the motor 108 can be of any suitable construction, it is conveniently a reversible electric motor such as a DC motor.

The frequency-responsive control circuit 85 is of a type which will respond to the frequency or pulse repetition rate of the pulse signals from the sensors 51 and 52 and which will produce an output signal at output lines 107 for driving the electroresponsive actuator 108 in a direction to increase or decrease the speed of the discharge means to maintain a preselected ratio between the speed of the vehicle and the speed of the discharge means. As is well understood to those skilled in the art, various different types of frequency-responsive circuits can be employed which will respond to the frequency or pulse repetition rate of the signals from the sensors 51 and 52 and produce an output signal correlative with the difference in their frequency or pulse repetition rates and of a character to operate the electroresponsive actuator 108 in a direction to increase or decrease the speed of the discharge means as may be required to maintain the preselected ratio between the speed of the vehicle and the speed of the discharge means. The circuit 85 can be of a type which would maintain a one to one ratio between the pulses of the sensors 51 and 52 or can be of a type which would maintain a relatively different ratio therebetween. However, if the speed of the discharge means as sensed by the shaft 91 is very low as compared to the speed of the vehicle as sensed by the shaft 81, or vice versa, then it is possible to modify the number of openings in the light-interrupter disc in one of the sensors with relation to that in the other sensor, so that at the desired relative speed of the vehicle and discharge means, the sensors 51 and 52 produce pulse outputs having a frequency of the same general order of magnitude.

From the foregoing it is thought that the construction and operation of the vehicle-type spreading apparatus will be readily understood. The photoelectric sensing units produce output signals having a frequency proportional to the speed of the vehicle and the speed of the discharge means respectively. However, the amplitude of these pulse signals is generally uniform over the entire range of vehicle speeds. The photoelectric sensing means thus overcomes the problems encountered with the previous electromagnetic sensing means, that is the problem of insufficient signal level at very low vehicle speeds and excessive signal level at high vehicle speeds. Moreover, the photoelectric sensors do not impose any pulsating load on the drive shafts such as the speedometer drive shaft 82, and thus minimize wear and erratic operation encountered in previous electromagnetic-type sensors. The frequency-responsive circuit 85 senses the pulse repetition rate or frequencies of the signals from sensors 51 and 52 and, when these pulse signals differ from a preselected ratio, the circuit 85 produces an output signal of a character to operate the electroresponsive means 108 in a direction to either increase or decrease flow to the hydraulic motor and hence increase and decrease the speed of the discharge means and the speed of the vehicle.

I claim:

1. In a wheeled vehicle-type material spreading apparatus having storage means for storing a quantity of material to be spread, discharge means for discharging material for the storage means, and control means operable to vary the rate at which said discharge means discharges material from said storage means, the improvement comprising photoelectric sensing means for sensing the speed of the vehicle, said photoelectric vehicle speed sensing means including a light source; a photosensitive unit; and a rotary element for interrupting light transmission from the light source to the photosensitive unit at a frequency proportional to the speed of the rotary element to produce a pulse signal having a pulse repetition rate proportional to the speed of said rotary element, means for driving said rotary element at a speed proportional to the speed of the vehicle, and means operatively connected to said photosensitive unit and responsive to the repetition rate of the pulse signal from said photosensitive unit for operating said control means to vary the rate of discharge of material by said discharge means correlative with the speed of the vehicle.

2. In a wheeled vehicle-type material spreading apparatus having storage means for storing a quantity of material to be spread, discharge means having a hydraulic drive motor discharging material from the storage means at a rate correlative with the speed of the hydraulic drive motor, fluid supply means for the hydraulic drive motor including control means for controlling the rate of flow of fluid to the hydraulic motor to vary the speed thereof from substantially zero speed to a relatively high speed, the improvement comprising photoelectric sensing means for sensing the speed of the vehicle, said photoelectric sensing means including a light source; a photosensitive unit; and a rotary element for interrupting the light transmission from the light source to the photosensitive unit at a frequency proportional to the speed of the rotary element to produce a pulse signal having a pulse repetition rate proportional to the speed of the rotary element, means for driving said rotary element at a speed proportional to the speed of the vehicle and means operatively connected to said photosensitive unit and responsive to the repetition rate of the pulse signal from said photosensitive unit for operating said control means to vary the rate of flow of fluid to said hydraulic motor, and hence the rate of discharge of material, correlative with the speed of the vehicle.

3. In a wheeled vehicle-type material spreading apparatus having storage means for storing a quantity of material to be spread, discharge means having rotary drive means operable to discharge material from the storage means at a rate correlative with the speed of the rotary drive means, and control means operable to vary the speed of the rotary drive means to thereby vary the rate of discharge of material by the discharge means, the improvement comprising a first photoelectric sensing means for sensing the speed of the vehicle, a second photoelectric sensing means for sensing the speed of the rotary drive means, said first and second photoelectric sensing means each including a light source; a photosensitive unit; and a rotary element for interrupting light transmission from the light source to the photosensitive unit at a frequency proportional to the speed of the rotary element whereby said first and second photoelectric sensing means respectively produce first and second pulse signals having pulse repetition rates proportional to the speed of their respective rotary element, means for driving the rotary element of the first sensing means at a speed proportional to the speed of the vehicle, means for driving the rotary element of the second sensing means at a speed proportional to the speed of the rotary drive means, and means operatively connected to the photosensitive units in each said first and second photoelectric sensing means and responsive to the pulse repetition rates of said first and second signals for operating said control means to vary the speed of the drive means in a direction to maintain a preselected relationship between the speed of the rotary drive means and the speed of the vehicle.

4. In a wheeled vehicle-type spreading apparatus having storage means for storing a quantity of material to be spread, discharge means having a hydraulic drive motor for discharging material from the storage means at a rate correlative with the speed of the hydraulic drive motor, fluid supply means for the hydraulic drive motor including control means for controlling the rate of flow of fluid to the hydraulic drive motor to vary the speed thereof from substantially zero speed to a relatively high speed, the improvement comprising a first photoelectric sensing means for sensing the speed of the vehicle, a second photoelectric sensing means for sensing the speed of the rotary drive means, said first and second sensing means each including a light source; a photosensitive unit; and a rotary element for interrupting light transmission from the light source to its photosensitive unit at a frequency proportional to the speed of the rotary element whereby said first and second photoelectric sensing units respectively produce first and second pulse signals having a pulse repetition rates proportional to the speed of their respective rotary element means for driving the rotary element of the first sensing means at a speed proportional to the speed of the vehicle, means for driving the rotary element of the second sensing means at a speed proportional to the speed of the vehicle, and means operatively connected to the first and second sensing means and responsive to the pulse repetition rates of said first and second signals for operating said control means to vary the rate of flow of fluid to the hydraulic drive motor and hence the rate of discharge of material correlative with the speed of the vehicle.